United States Patent
Vercalli et al.

(10) Patent No.: US 12,483,425 B2
(45) Date of Patent: Nov. 25, 2025

(54) CLIENT-SERVER RESPONSE TIME BASED COMPUTER SYSTEM GEOLOCATION

(71) Applicant: International Business Machines Corporation, Armonk, NY (US)

(72) Inventors: Emanuele Vercalli, Cologno Monzese (IT); Federico Accetta, Milan (IT); Massimo Caprinali, Merate (IT); Roberto Ragusa, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 18/214,581

(22) Filed: Jun. 27, 2023

(65) Prior Publication Data
US 2025/0007730 A1    Jan. 2, 2025

(51) Int. Cl.
*G06F 15/16*    (2006.01)
*H04L 9/32*    (2006.01)
*H04L 67/52*    (2022.01)

(52) U.S. Cl.
CPC .......... *H04L 9/3263* (2013.01); *H04L 9/3271* (2013.01); *H04L 9/3297* (2013.01); *H04L 67/52* (2022.05)

(58) Field of Classification Search
CPC ... H04L 9/3263; H04L 9/3271; H04L 9/3297; H04L 67/52
See application file for complete search history.

(56) References Cited

U.S. PATENT DOCUMENTS

| | | | |
|---|---|---|---|
| 5,970,414 A | * | 10/1999 | Bi .............................. G01S 5/14 455/457 |
| 9,069,052 B2 | | 6/2015 | Hsu et al. |
| 10,341,335 B2 | | 7/2019 | Thompson |
| 10,439,820 B2 | | 10/2019 | Egner et al. |
| 11,395,092 B2 | | 7/2022 | Beauford |

(Continued)

FOREIGN PATENT DOCUMENTS

| | | |
|---|---|---|
| JP | 2003319443 A | 11/2003 |
| WO | WO-2017108294 A1 * | 6/2017 |
| WO | 2025/002936 A1 | 1/2025 |

OTHER PUBLICATIONS

International Searching Authority, PCT/EP2024/067059, Aug. 14, 2024.

(Continued)

*Primary Examiner* — Normin Abedin
(74) *Attorney, Agent, or Firm* — Garg Law Firm, PLLC; Rakesh Garg; Anthony Mauricio Pallone

(57) ABSTRACT

An embodiment sends, at a first time, from a boundary server to a client system in response to a challenge request, a challenge specifying a computational problem to be solved by the client system, the boundary server specified in a challenge list sent to the client system. An embodiment receives, at a second time, at the boundary server, a challenge response from the client system, the challenge response comprising a solution to the computational problem. An embodiment generates, at the boundary server, a certificate encoding an elapsed time between the first time and the second time, the certificate usable by the client system to prove a location of the client system. An embodiment sends, from the boundary server to the client system, the certificate.

18 Claims, 6 Drawing Sheets

(56) References Cited

U.S. PATENT DOCUMENTS

2016/0323261 A1   11/2016  Thompson
2017/0289137 A1* 10/2017  Pendarakis ......... H04L 63/0823
2020/0403808 A1* 12/2020  Smith .................. H04W 12/06

OTHER PUBLICATIONS

Zhang et al., Location-based Authentication and Authorization Using Smart Phones, 2012 IEEE 11th International Conference on Trust, Security and Privacy in Computing and Communications, Jun. 2012.

Hillmann et al., Modelling of IP Geolocation by use of Latency Measurements, Apr. 16, 2020.

Maram et al., GoAT: File Geolocation via Anchor Timestamping, May 31, 2022.

* cited by examiner

CLIENT-SERVER RESPONSE TIME BASED COMPUTER SYSTEM GEOLOCATION

BACKGROUND

The present invention relates generally to a method, system, and computer program product for computer system geolocation. More particularly, the present invention relates to a method, system, and computer program product for client-server response time based computer system geolocation.

Geolocation is the process of determining or estimating the geographic position, or physical location, of an object on Earth. The determined or estimated location can be expressed in latitude/longitude coordinates, in relation to another object having a fixed, known location, or using a different measurement or coordinate system. Often, geolocation is performed to collect data for another process. For example, an object's location at two different times can be used to compute the object's velocity, or a car's location with respect to a road map and street address data can be used to provide driving directions. Geolocation is typically performed to a desired accuracy, depending on the use case of the physical location to be determined. For example, if the use case is to determine whether or not an object is located on a particular continent, such as North America, an accuracy of ±100 kilometers might be sufficient. However, as another example, if the use case is to determine where an airplane is, laterally, in relation to the approach end of an airport runway, an accuracy of ±200 meters might be appropriate.

The illustrative embodiments recognize that there is a need to geolocate a computer system, and that incentives exist to falsify the geolocation. For example, some laws apply to computers or computer users in particular jurisdictions, and to comply with these laws a service provider might adapt the functionality of its product according to the service provider's knowledge of which jurisdiction a computer system is within. Similarly, as some transactions may only be permitted in certain jurisdictions, and transactions are often taxed differently in different jurisdictions, users might be interested in declaring that the computer system they are using is in a jurisdiction in which a transaction is permitted to be performed, or is in a jurisdiction with the lowest tax rate. Some content (e.g., sports or movies) is only licensed to be viewed by viewers in specific countries and not in other countries. As another example, a user location (as measured by the user's device) that changes faster than is possible than the user could realistically travel might be an indicator of a fraudulent transaction.

The illustrative embodiments recognize that one geolocation technique used in locating a computer system is to rely on the system's self-reported location, or on a user of the system's self-reported location. However, relying on a system's self-reported location assumes that the system is telling the truth about its location, and a system's self-reported location is easily falsified. The illustrative embodiments recognize that another geolocation technique is to rely on the location of a system's Internet Protocol (IP) address, as stored in a database. However, IP address-based location data is subject to changes in the database data, is not easily verifiable, is not always associated with a single computer system, is often insufficiently precise, even at the level of which country a system is in, and the technique can be defeated by substituting a false IP address, with a different location, for the source system's real IP address. As well, if the system to be geolocated is using a virtual private network (VPN), IP address-based location data will provide the location of the VPN, not the system itself. Thus, the illustrative embodiments recognize that there is a need for a computer system geolocation technique that is verifiable using a data source that is not controlled by the computer system itself.

SUMMARY

The illustrative embodiments provide for client-server response time based computer system geolocation. An embodiment includes sending, at a first time, from a boundary server to a client system in response to a challenge request, a challenge specifying a computational problem to be solved by the client system, the boundary server specified in a challenge list sent to the client system. An embodiment includes receiving, at a second time, at the boundary server, a challenge response from the client system, the challenge response comprising a solution to the computational problem. An embodiment includes generating, at the boundary server, a certificate encoding an elapsed time between the first time and the second time, the certificate usable by the client system to prove a location of the client system. sending, from the boundary server to the client system, the certificate. Thus, an embodiment provides a method implementing client-server response time based computer system geolocation. Other embodiments of this aspect include corresponding computer systems, apparatus, and computer programs recorded on one or more computer storage devices, each configured to perform the actions of the embodiment.

In another embodiment, the challenge list comprises a plurality of boundary servers including the boundary server, each of the plurality of boundary servers having a known physical location. Thus, the embodiment provides additional detail of implementing client-server response time based computer system geolocation, in which each of a plurality of boundary servers used to perform the geolocation has a known physical location.

In another embodiment, each of the plurality of boundary servers was selected for inclusion in the challenge list using the known physical location of each of the plurality of boundary servers. Thus, the embodiment provides additional detail of implementing client-server response time based computer system geolocation, in which each of a plurality of boundary servers used to perform the geolocation was selected using the boundary servers' known physical locations.

In another embodiment, the elapsed time encoded in the certificate, a second elapsed time encoded in a second certificate generated by a second boundary server, and a third elapsed time encoded in a third certificate generated by a third boundary server are usable in performing trilateration of the location of the client system. Thus, the embodiment provides additional detail of implementing client-server response time based computer system geolocation using three certificates, each generated by a boundary server.

Another embodiment includes cryptographically signing, at the boundary server, prior to the sending, the certificate, the signing performed using a key unknown to the client system. Thus, the embodiment provides additional detail of implementing client-server response time based computer system geolocation, using a cryptographically signed certificate.

Another embodiment includes sending, at a third time, from the boundary server to the client system in response to a second challenge request, a second challenge specifying a string to be echoed by the client system. The embodiment includes receiving, at a fourth time, at the boundary server, a second challenge response from the client system, the second challenge response comprising the string. The embodiment includes generating, at the boundary server, a fourth certificate encoding the lesser of the elapsed time and a second elapsed time, the second elapsed time comprising a difference between the fourth time and the third time, the fourth certificate usable by the client system to prove the location of the client system. Thus, the embodiment provides additional detail of implementing client-server response time based computer system geolocation, by determining a second elapsed time and generating a certificate using the lesser of the elapsed time and the second elapsed time.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
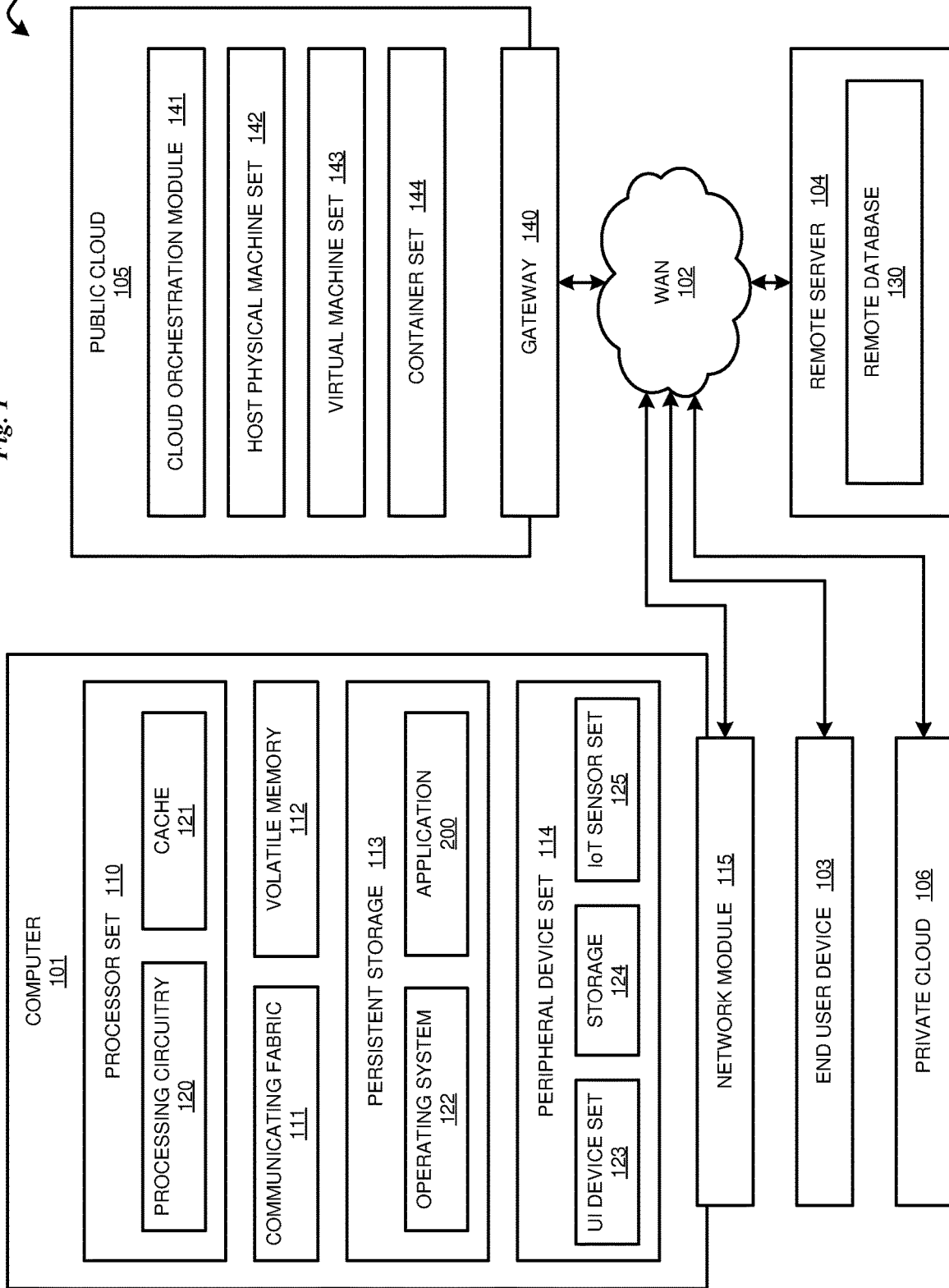
FIG. 1 depicts a block diagram of a computing environment in accordance with an illustrative embodiment.

The illustrative embodiments recognize that there is a need for a computer system geolocation technique that is verifiable using a data source that is not controlled by the computer system itself. The illustrative embodiments recognize that the presently available tools or solutions do not address these needs or provide adequate solutions for these needs.

The present disclosure addresses the deficiencies described above by providing a process (as well as a system, method, machine-readable medium, etc.) that sends, at a first time, from a boundary server to a client system in response to a challenge request, a challenge specifying a computational problem to be solved by the client system; receives, at a second time, at the boundary server, a challenge response from the client system; and generates, at the boundary server, a certificate encoding an elapsed time between the first time and the second time.

The illustrative embodiments provide for client-server response time based computer system geolocation. Illustrative embodiments include an embodiment requesting geolocation (client embodiment), an embodiment from which a client embodiment requests geolocation (identification embodiment), and an embodiment measuring a response time of a client embodiment (boundary embodiment). Client, identification, and boundary embodiments can execute in the same or different systems. Client, identification, and boundary embodiments communicate messages with each other over a communications network such as the Internet. Some embodiments communicate messages with each other using Hypertext Transfer Protocol Secure (HTTPS), in which the messages are encrypted in transit between embodiments.

A client embodiment, executing on a client system, initiates a geolocation request for the client system by sending a service request to an identification embodiment. In some embodiments, the service request includes a physical location the client embodiment is requesting verification or validation of. For example, the physical location to be verified or validated might have been obtained using a Global Positioning System (GPS) receiver, or received as input from a user. In some embodiments, the service request includes a desired geolocation accuracy (e.g., the requested geolocation should be accurate to within 2 km of the requested location) or geolocation confidence level (e.g., the requested geolocation should have a 90% confidence), or both a desired geolocation accuracy and confidence level. Some non-limiting examples of service requests are a request for verification that the client system is in the continental portion of the United States±10 kilometers, within a 10 km radius of a specified latitude and longitude with a 90% confidence, or anywhere within the European Union. In other embodiments, the service request does not include a physical location the client embodiment is requesting verification of.

An identification embodiment receives the service request, and selects one or more boundary servers for use in performing the geolocation requested in the service request. Each boundary server has a fixed physical location already known to an identification embodiment. In particular, because selected boundary servers are usable to determine a client system's location, each selected boundary server has a physical location different from any other selected boundary server. One identification embodiment selects one or more boundary servers based on a physical location included in the service request. For example, if the service request includes a request for verification that the client embodiment is in the continental United States, the identification embodiment might select four boundary servers, one each in the northeast, northwest, southeast, and southwest corners of the continental United States. Another identification embodiment selects one or more boundary servers based on the location of the requesting system's IP address, as stored in a database. For example, if the service request originates from an IP address that according to the database is in the European Union, the identification embodiment might select boundary servers distributed near the periphery of the European Union. Another identification embodiment selects one or more boundary servers based on a desired geolocation accuracy or confidence level, if available, or a default geolocation accuracy or confidence level. Another identification embodiment selects one or more boundary servers based on the boundary servers' known locations. For example, selecting a boundary server in North America, one in Europe, and one in Africa might be sufficient to geolocate a system on which a client embodiment is executing to a particular continent. If a boundary embodiment is not yet executing on a selected boundary server, an identification embodiment causes an instance of a boundary embodiment to begin executing on a selected boundary server.

An identification embodiment notifies a selected boundary embodiment of its selection. The selection notification is also referred to as a reservation. In some embodiments, the notification includes a check as to whether the selected boundary server is available for geolocation purposes, an identification of the client embodiment to be geolocated, an selection of a challenge type to be used with the client embodiment, a number of times the challenge should be repeated, one or more criteria used to determine a validity of a boundary embodiment's elapsed time measurement, a cryptographic key used in communicating between the boundary embodiment and a client embodiment, or another time measurement or communication parameter.

A boundary embodiment responds to the identification embodiment's notification with an acknowledgement. The acknowledgement indicates that the boundary embodiment is ready to respond to a challenge request from a client embodiment.

Once an identification embodiment has received an acknowledgement from a boundary embodiment executing in each of the selected boundary server(s), the identification embodiment sends a challenge list to the client embodiment requesting geolocation. In embodiments, the challenge list includes communication information for the selected boundary embodiment(s), including one or more of an identification of each of the boundary embodiments, an identification (e.g., a message prefix) to be used by the client embodiment in communications with a boundary embodiment, a number of times the challenge should be repeated, a cryptographic key used in communicating between the boundary embodiment and the client embodiment, or another time measurement or communication parameter.

A client embodiment sends a challenge request to a boundary embodiment. In some embodiments, the boundary embodiment is specified in a challenge list sent from the identification embodiment to the client embodiment. A challenge request is a message from a client embodiment to a boundary embodiment. The challenge request requests geolocation of the system on which the client embodiment is executing, formatted according to a communication parameter specified in the challenge list. For example, if the challenge list included a message prefix to be used by the client embodiment in communications with a boundary embodiment, the challenge request includes the specified message prefix.

A boundary embodiment responds to a challenge request by generating and sending a challenge to the client embodiment that sent the challenge request. A boundary embodiment records a first time at which the challenge was sent, for use in computing an elapsed time for the client embodiment's response to the challenge. Because a challenge and the client embodiment's response to the challenge are used only to measure the client embodiment's response time to the challenge, the challenge need not be computationally complex, and need not be in any particular format, but does need to be a message a client cannot shorten the response time to by sending a response before receiving the actual challenge. For example, a ping (sending an Internet Control Message Protocol (ICMP) echo request to a target system and waiting for an ICMP echo reply) might not be usable as a challenge, because techniques are presently available to send a ping response before actually receiving the ping. Thus, in some embodiments, the challenge specifies a computational problem to be solved by the client embodiment. A boundary embodiment selects a type of computational problem from a list of possible types of problems (e.g., addition, subtraction, multiplication, division), and randomly selects the parameters of the problem (e.g., which numbers are to be added together). One boundary embodiment randomly selects a type of computational problem from a list of possible types of problems. Some non-limiting examples of a challenge might be to add two and two together, to multiply four and eight together, or to perform an image manipulation or text conversion. In other embodiments, the challenge specifies a randomly selected string to be echoed back by the client embodiment. In other embodiments, the challenge specifies a randomly selected JSON web token to be echoed back by the client embodiment. A JSON Web Token is a presently available technique for creating data (the token) with an optional signature and optional encryption. The token's payload holds data in JSON (JavaScript Object Notation, a presently available standard data interchange format that uses human-readable text to store and transmit data objects consisting of attribute-value pairs and arrays) that asserts one or more statements. Other challenges are also possible and contemplated within the scope of the illustrative embodiments. In embodiments, random selection is performed using a pseudo-random number generator, a presently available technique for generating pseudo-random numbers using a processor.

A client embodiment receives the challenge from the boundary embodiment, generates a response to the challenge, and sends the challenge response back to the boundary embodiment that issued the challenge. If the challenge was a computational problem, the challenge response comprises a solution to the computational problem. For example, if the challenge was to add two and two together, the client embodiment might generate a challenge response indicating that the answer is four. If the challenge was something to be echoed back, the challenge response is the item to be echoed back. Other challenge responses are also possible and appropriate to the specific challenge received, and the same are contemplated within the scope of the illustrative embodiments.

A boundary embodiment receives, at a second time, the generated challenge response from the client embodiment. A boundary embodiment computes an elapsed time between a first time (when the challenge was sent) and a second time (when the challenge response was received).

One boundary embodiment repeats the challenge, challenge response, and elapsed time computation one or more additional times, and uses the best (i.e., smallest, or minimum) elapsed time as the final value of the elapsed time. Because communications can be disturbed or slowed by network conditions, but not speeded up, the minimum elapsed time is most indicative of a physical distance between a boundary server (with a known physical location) and a client system (with a physical location being measured or verified).

A boundary embodiment generates a certificate encoding the elapsed time between the first time and the second time, or encoding the minimum elapsed time if a plurality of measurements were performed. The certificate and the encoding need not be in any particular format. The certificate is usable by the client embodiment to prove a location of the client system. One boundary embodiment uses a presently available technique to cryptographically sign the certificate. Cryptographically signing the certificate, using a key known to the boundary embodiment and the identification embodiment but not the client embodiment, provides assurance that the client embodiment has not tampered with the certificate. A boundary embodiment sends the generated certificate to the client embodiment.

A client embodiment repeats a challenge request, challenge receipt, challenge response, and certificate receipt sequence described herein using a different boundary embodiment specified in the challenge list received from an identification embodiment. One client embodiment performs challenge request, challenge receipt, challenge response, and certificate receipt sequences described herein, for multiple boundary embodiments, in parallel with each other. Another client embodiment performs challenge request, challenge receipt, challenge response, and certificate receipt sequences described herein, for multiple boundary embodiments, in series with each other.

A client embodiment submits a received certificate to an identification embodiment. An identification embodiment receives one or more certificates from a client embodiment, optionally uses a presently available technique to determine that the certificate(s) are valid, and decodes the elapsed time encoded into each certificate by the boundary embodiment.

An identification embodiment uses the elapsed time(s) and a presently available trilateration technique to calculate a physical location of the client system. Trilateration, or multilateration, is the use of distances for determining the unknown physical location of a point. For example, GPS receivers work by measuring a travel time for a signal (and thus, a distance) between a GPS satellite at a known position and a receiver on the Earth's surface. Measuring the distance to one satellite yields a circle of points on which the receiver could be located. Measuring the distance to a second satellite yields a second circle of points on which the receiver could be located, and thus the receiver could be at a point where the two circles intersect. Measuring the distance to one or more additional satellite(s) yields additional circle(s) of points on which the receiver could be located, thus narrowing the receiver's possible location to a point where all of the circles intersect. Similarly, if a client system is 10 ms (in an elapsed time between challenge and response) from one boundary server, 15 ms from a second boundary server, and 20 ms from a third boundary server, the client system must be at a point where a 10 ms radius circle around the first boundary server, a 15 ms radius circle around the second boundary server, and a 20 ms radius circle around the third boundary server all intersect.

If the calculated physical location of the client system matches, within a threshold amount, the client embodiment's service request, an identification embodiment provides a location validation to the client embodiment. In particular, if the service request included a physical location the client embodiment is requesting validation of, and the calculated physical location of the client system matches, within a threshold amount, that physical location, an identification embodiment provides a location validation of the requested physical location. If the service request included a desired geolocation accuracy or geolocation confidence level, and the calculated physical location of the client system has at least the desired accuracy or confidence level, an identification embodiment provides a location validation to the client embodiment. One identification embodiment uses a presently available cryptographic signing technique to sign the location validation with a key the client embodiment does not have access to.

Another set of embodiments measures and stores elapsed time(s) between a client system and boundary server(s) at an initial measurement time in a manner described herein. For example, the measurement at the initial measurement time might be performed as part of a registration process. At a later time, the set of embodiments remeasures elapsed time(s) between the same client system and boundary server(s) in a manner described herein. If the elapsed time(s) have not changed by more than a threshold amount or percentage between the initial measurement time and the later time, the identification embodiment provides a location validation to the client embodiment.

A client embodiment submits the location validation to a third party, thus proving to the third party that the client system (on which the client embodiment is executing) is in a validated physical location. In response to the submission, the third party allows a client embodiment or client system to access data or perform an operation available only to a client system with a validated physical location or an acceptable validated physical location. For example, the third party, having validated the client system as being in a particular country, might allow a client system to access video content available only in that country.

The manner of client-server response time-based geolocation described herein is unavailable in the presently available methods in the technological field of endeavor pertaining to computer system geolocation. A method of an embodiment described herein, when implemented to execute on a device or data processing system, comprises substantial advancement of the functionality of that device or data processing system in sending, at a first time, from a boundary server to a client system in response to a challenge request, a challenge specifying a computational problem to be solved by the client system; receiving, at a second time, at the boundary server, a challenge response from the client system; and generating, at the boundary server, a certificate encoding an elapsed time between the first time and the second time.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as application 200 that provides client-server response time-based geolocation in accordance with an illustrative embodiment. In particular, application 200 implements a client, identification, or boundary embodiment as described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
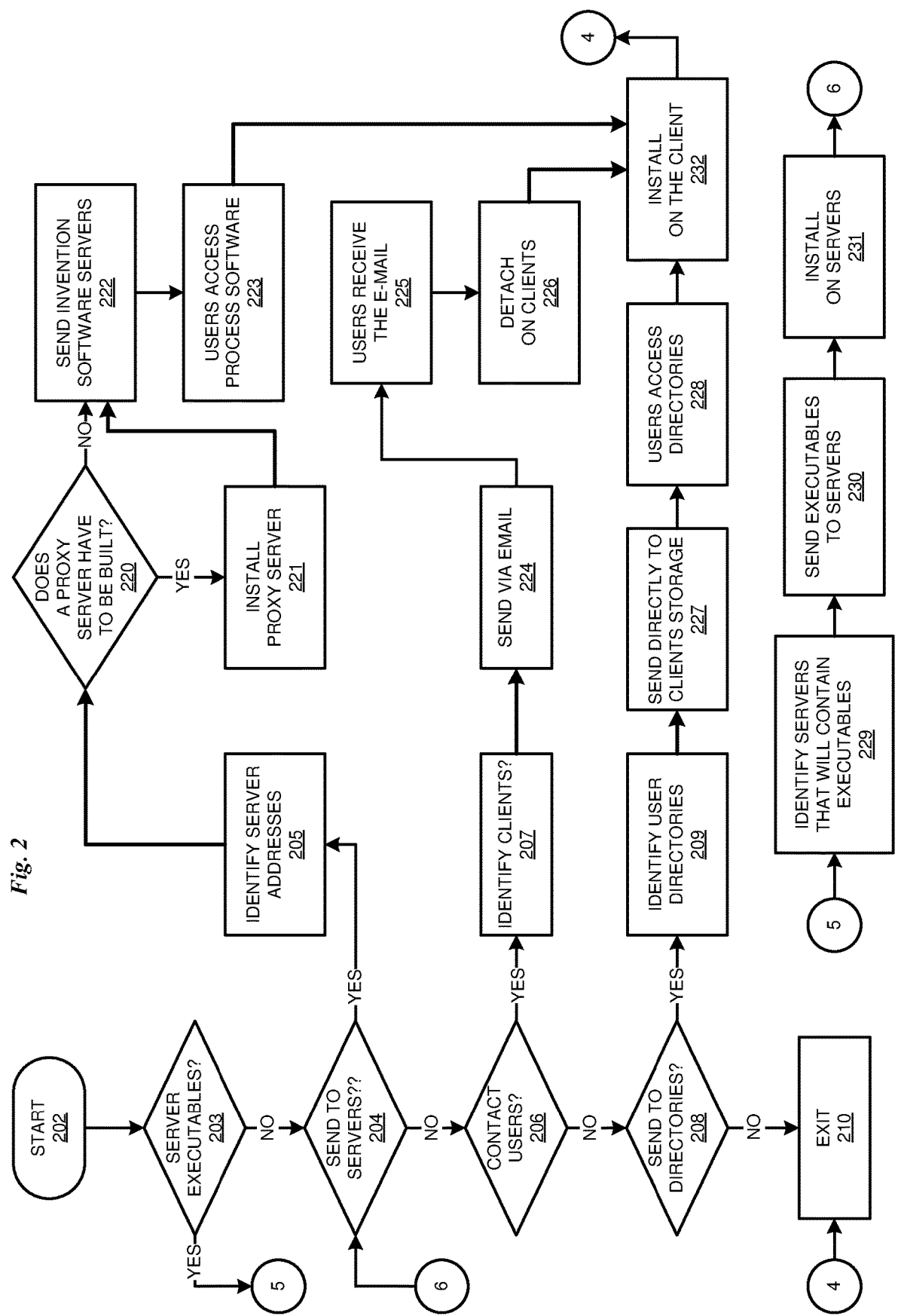
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing client-server response time based computer system geolocation may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
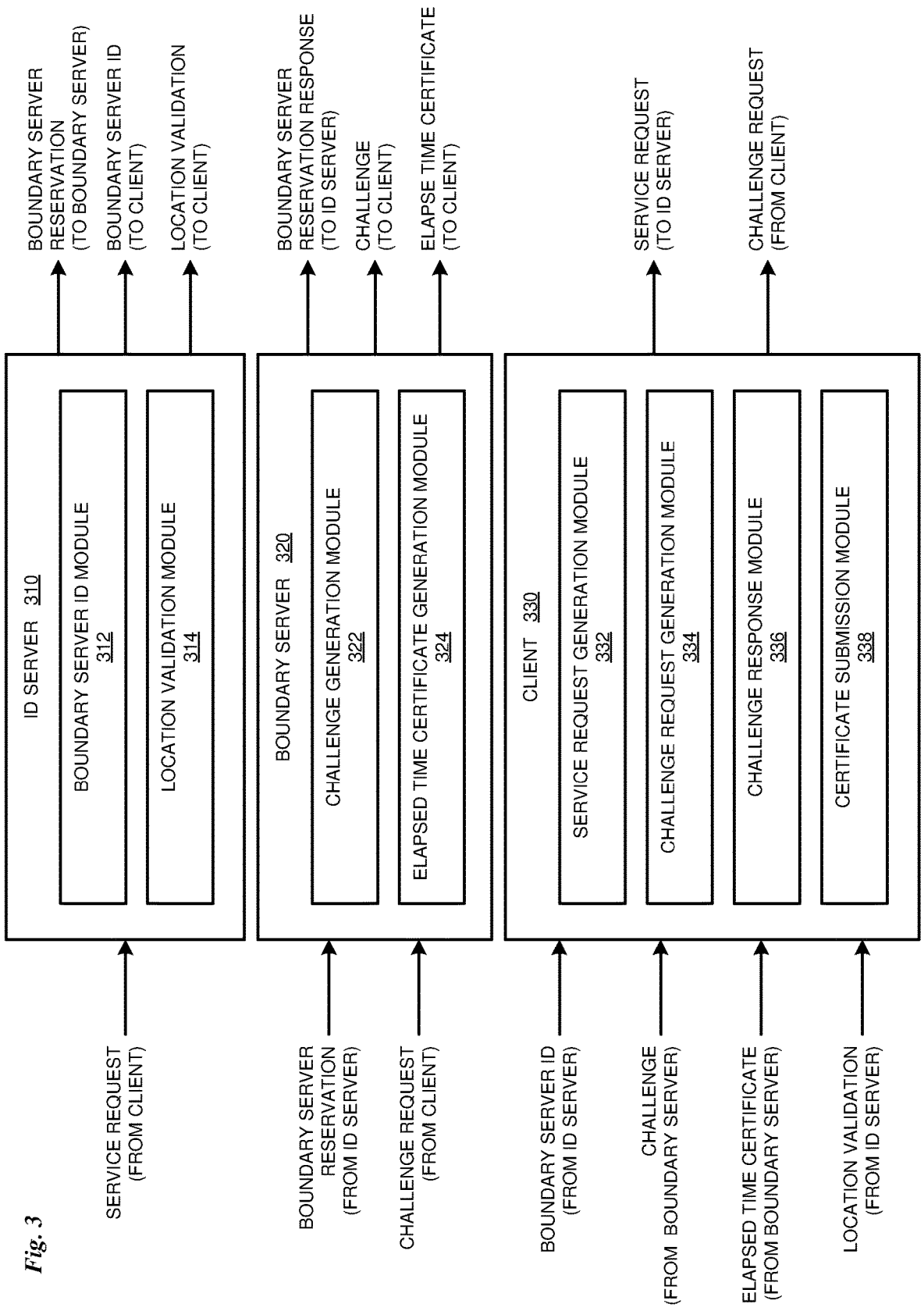
FIG. 3 depicts a block diagram of an example configuration for client-server response time based computer system geolocation in accordance with an illustrative embodiment.

With reference to FIG. 3, this figure depicts a block diagram of an example configuration for client-server response time based computer system geolocation in accordance with an illustrative embodiment. In particular, identification (ID) server 310, boundary server 320, and client 330 are each an example of application 200 in FIG. 1.

In the illustrated embodiments, service request generation module 332 of client 330, executing on a client system, initiates a geolocation request for the client system by sending a service request to identification server 310. In some implementations of module 332, the service request includes a physical location client 330 is requesting verification or validation of. For example, the physical location to be verified or validated might have been obtained using a GPS receiver, or received as input from a user. In some implementations of module 332, the service request includes a desired geolocation accuracy (e.g., the requested geolocation should be accurate to within 2 km of the requested location) or geolocation confidence level (e.g., the requested geolocation should have a 90% confidence), or both a desired geolocation accuracy and confidence level. Some non-limiting examples of service requests are a request for verification that client 330 is in the continental portion of the United States±10 kilometers, within a 10 km radius of a specified latitude and longitude with a 90% confidence, or anywhere within the European Union. In other implementations of module 332, the service request does not include a physical location client 330 is requesting verification of.

Boundary server ID module 312, in ID server 310, receives the service request, and selects one or more instances of boundary server 320 for use in performing the geolocation requested in the service request. Each instance of boundary server 320 has a fixed physical location already known to module 312. In particular, because selected boundary servers are usable to determine a client system's location, each selected instance of boundary server 320 has a physical location different from any other selected boundary server. One implementation of module 312 selects one or more instances of boundary server 320 based on a physical location included in the service request. For example, if the service request includes a request for verification that client 330 is in the continental United States, module 312 might select four boundary servers, one each in the northeast, northwest, southeast, and southwest corners of the continental United States. Another implementation of module 312 selects one or more boundary servers based on the location of client 330's IP address, as stored in a database. For example, if the service request originates from an IP address that according to the database is in the European Union, module 312 might select boundary servers distributed near the periphery of the European Union. Another implementation of module 312 selects one or more boundary servers based on a desired geolocation accuracy or confidence level, if available, or a default geolocation accuracy or confidence level. Another implementation of module 312 selects one or more boundary servers based on the boundary servers' known locations. For example, selecting a boundary server in North America, one in Europe, and one in Africa might be sufficient to geolocate a system on which client 330 is executing to a particular continent. If boundary server 320 is not yet executing on a selected boundary server, module 312 causes an instance of boundary server 320 to begin executing on a selected boundary server.

Module 312 notifies a selected instance of boundary server 320 of its selection. The selection notification is also referred to as a reservation. In some implementations of module 312, the notification includes a check as to whether the instance of boundary server 320 is available for geolocation purposes, an identification of client 330 to be geolocated, an selection of a challenge type to be used with client 330, a number of times the challenge should be repeated, one or more criteria used to determine a validity of boundary server 320's elapsed time measurement, a cryptographic key used in communicating between boundary server 320 and client 330, or another time measurement or communication parameter.

Boundary server 320 responds to the notification with an acknowledgement. The acknowledgement indicates that boundary server 320 is ready to respond to a challenge request from client 330.

Once module 312 has received an acknowledgement from instance(s) of boundary server 320 executing in each of the selected boundary server(s), module 312 sends a challenge list to client 330. In implementations of module 312, the challenge list includes communication information for the selected instance(s) of boundary server 320, including one or more of an identification of each of the instance(s) of boundary server 320, an identification (e.g., a message prefix) to be used by client 330 in communications with an instance of boundary server 320, a number of times the challenge should be repeated, a cryptographic key used in communicating between an instance of boundary server 320 and client 330, or another time measurement or communication parameter.

Challenge request generation module 334 sends a challenge request to an instance of boundary server 320. In some implementations, the instance is specified in a challenge list sent from identification server 310 to client 330. A challenge request is a message from client 330 to an instance of boundary server 320. The challenge request requests geolocation of the system on which client 330 is executing, formatted according to a communication parameter specified in the challenge list. For example, if the challenge list included a message prefix to be used by client 330 in communications with an instance of boundary server 320, the challenge request includes the specified message prefix.

Challenge generation module 322 responds to a challenge request by generating and sending a challenge to client 330. Module 322 records a first time at which the challenge was sent, for use in computing an elapsed time for client 330's response to the challenge. The challenge need not be computationally complex, and need not be in any particular format, but does need to be a message client 330 cannot shorten the response time to by sending a response before receiving the actual challenge. For example, a ping might not be usable as a challenge, because techniques are presently available to send a ping response before actually receiving the ping. Thus, in some implementations of module 322, the challenge specifies a computational problem to be solved by client 330, and module 322 selects a type of computational problem from a list of possible types of problems (e.g., addition, subtraction, multiplication, division), and randomly selects the parameters of the problem (e.g., which numbers are to be added together). One implementation of module 322 randomly selects a type of computational problem from a list of possible types of problems. Some non-limiting examples of a challenge might be to add two and two together, to multiply four and eight together, or to perform an image manipulation or text conversion. In other implementations of module 322, the challenge specifies a randomly selected string to be echoed back by client 330. In other implementations of module 322, the challenge specifies a randomly selected JSON web token to be echoed back by client 330. Other challenges are also possible. In implementations of the illustrative embodiments, random selection is performed using a pseudo-random number generator, a presently available technique for generating pseudo-random numbers using a processor.

Challenge response module 336 receives the challenge from an instance of boundary server 320, generates a response to the challenge, and sends the challenge response back to the instance of boundary server 320 that issued the challenge. If the challenge was a computational problem, the challenge response comprises a solution to the computational problem. For example, if the challenge was to add two and two together, module 336 might generate a challenge response indicating that the answer is four. If the challenge was something to be echoed back, the challenge response is the item to be echoed back. Other challenge responses are also possible and appropriate to the specific challenge received.

Elapsed time certificate generation module 324 receives, at a second time, the generated challenge response from client 330. Module 324 computes an elapsed time between a first time (when the challenge was sent) and a second time (when the challenge response was received).

One implementation of boundary server 320 repeats the challenge, challenge response, and elapsed time computation one or more additional times, and uses the best (i.e., smallest, or minimum) elapsed time as the final value of the elapsed time. Because communications can be disturbed or slowed by network conditions, but not speeded up, the minimum elapsed time is most indicative of a physical distance between a boundary server (with a known physical location) and a client system (with a physical location being measured or verified).

Module 324 generates a certificate encoding the elapsed time between the first time and the second time, or encoding the minimum elapsed time if a plurality of measurements were performed. The certificate is usable by client 330 to prove a location of the client system. One implementation of module 324 uses a presently available technique to cryptographically sign the certificate. Cryptographically signing the certificate, using a key known to boundary server 320 and identification server 310 but not client 330, provides assurance that client 330 has not tampered with the certificate. Module 324 sends the generated certificate to client 330.

Client 330 repeats a challenge request, challenge receipt, challenge response, and certificate receipt sequence described herein using a different instance of boundary server 320 specified in the challenge list received from identification server 310. One implementation of client 330 performs challenge request, challenge receipt, challenge response, and certificate receipt sequences described herein, for multiple instances of boundary server 320, in parallel with each other. Another implementation of client 330 performs challenge request, challenge receipt, challenge response, and certificate receipt sequences described herein, for multiple instances of boundary server 320, in series with each other.

Certificate submission module 338 submits a received certificate to identification server 310. Location validation module 314 receives one or more certificates from client 330, optionally uses a presently available technique to determine that the certificate(s) are valid, and decodes the elapsed time encoded into each certificate by an instance of boundary server 320.

Module 314 uses the elapsed time(s) and a presently available trilateration technique to calculate a physical location of the client system. Trilateration, or multilateration, is the use of distances for determining the unknown physical location of a point. For example, if client 330 is 10 ms (in an elapsed time between challenge and response) from one instance of boundary server 320, 15 ms from a second instance of boundary server 320, and 20 ms from a third instance of boundary server 320, client 330 must be at a point where a 10 ms radius circle around the first instance of boundary server 320, a 15 ms radius circle around the second instance of boundary server 320, and a 20 ms radius circle around the third instance of boundary server 320 all intersect.

If the calculated physical location of client 330 matches, within a threshold amount, client 330's service request, module 314 provides a location validation to client 330. In particular, if the service request included a physical location client 330 is requesting validation of, and the calculated physical location of client 330 matches, within a threshold amount, that physical location, module 314 provides a location validation of the requested physical location. If the service request included a desired geolocation accuracy or geolocation confidence level, and the calculated physical location of client 330 has at least the desired accuracy or confidence level, module 314 provides a location validation to client 330. One implementation of module 314 uses a presently available cryptographic signing technique to sign the location validation with a key client 330 does not have access to.

Another set of implementations of identification server 310, boundary server(s) 320, and client 330 measures and stores elapsed time(s) between a client system and boundary server(s) at an initial measurement time in a manner described herein. For example, the measurement at the initial measurement time might be performed as part of a registration process. At a later time, the set of implementations remeasures elapsed time(s) between the same client system and boundary server(s) in a manner described herein. If the elapsed time(s) have not changed by more than a threshold amount or percentage between the initial measurement time and the later time, identification server 310 provides a location validation to client 330.

Client 330 submits the location validation to a third party, thus proving to the third party that the client system (on which client 330 is executing) is in a validated physical location. In response to the submission, the third party allows client 330 or its system to access data or perform an operation available only to a client system with a validated physical location or an acceptable validated physical location. For example, the third party, having validated the client system as being in a particular country, might allow a client system to access video content available only in that country.

Figure 4:
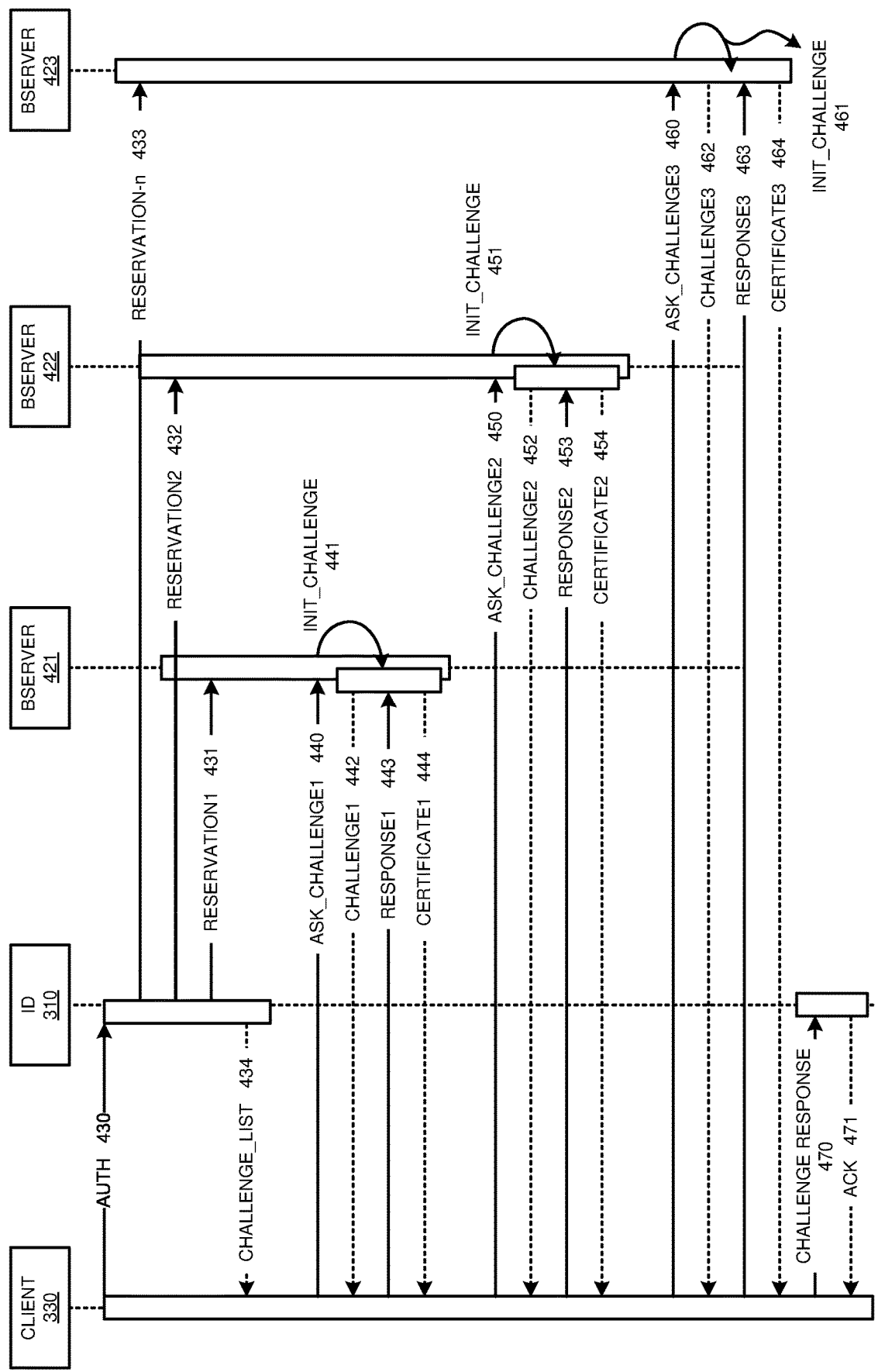
FIG. 4 depicts a sequence of messages used in implementing an example configuration for client-server response time based computer system geolocation in accordance with an illustrative embodiment.

With reference to FIG. 4, this figure depicts a sequence of messages used in implementing an example configuration for client-server response time based computer system geolocation in accordance with an illustrative embodiment. Identification (ID) server 310 and client 330 are the same as ID server 310 and client 330 in FIG. 3. Bservers 421, 422, and 423 are each an instance of boundary server 320 in FIG. 3.

As depicted, client 330 initiates a geolocation request for the client system by sending auth 430, a service request, to identification server 310. In response, ID server 310 selects Bservers 421, 422, and 423 for use in performing the geolocation requested in the service request, and sends reservation1 431, reservation2 432, and reservation-n 433 to Bservers 421, 422, and 423 respectively, notifying each selected instance of its selection. Bservers 421, 422, and 423 respond with an acknowledgement (not depicted). Once ID server 310 has received an acknowledgement from Bservers 421, 422, and 423, ID server 310 sends challenge_list 434 to client 330.

Client 330 then sends ask_challenge1 440, a challenge request, to Bserver 421. Bserver 421 responds to ask_challenge1 440 by generating (init_challenge 441) and sending a challenge (challenge1 442) to client 330. Bserver 421 records a first time at which the challenge was sent. Client 330 generates response1 443, and sends response1 443 back to Bserver 421. Bserver 421 generates and sends certificate1 444, encoding the elapsed time between challenge1 442 and response 1 443.

Client 330 also sends ask_challenge2 450, a challenge request, to Bserver 422. Bserver 422 responds to ask_challenge2 450 by generating (init_challenge 451) and sending a challenge (challenge2 452) to client 330. Bserver 422 records a first time at which the challenge was sent. Client 330 generates response2 453, and sends response2 453 back to Bserver 422. Bserver 422 generates and sends certificate2 454, encoding the elapsed time between challenge2 452 and response2 453.

Client 330 also sends ask_challenge3 460, a challenge request, to Bserver 423. Bserver 423 responds to ask_challenge3 460 by generating (init_challenge 461) and sending a challenge (challenge3 462) to client 330. Bserver 423 records a first time at which the challenge was sent. Client 330 generates response3 463, and sends response3 463 back to Bserver 423. Bserver 423 generates and sends certificate3 464, encoding the elapsed time between challenge3 462 and response3 463.

Client 330 then submits challenge response 470, the received certificates, to identification server 310, which responds with ack 471, a location validation, to client 330.

Figure 5:
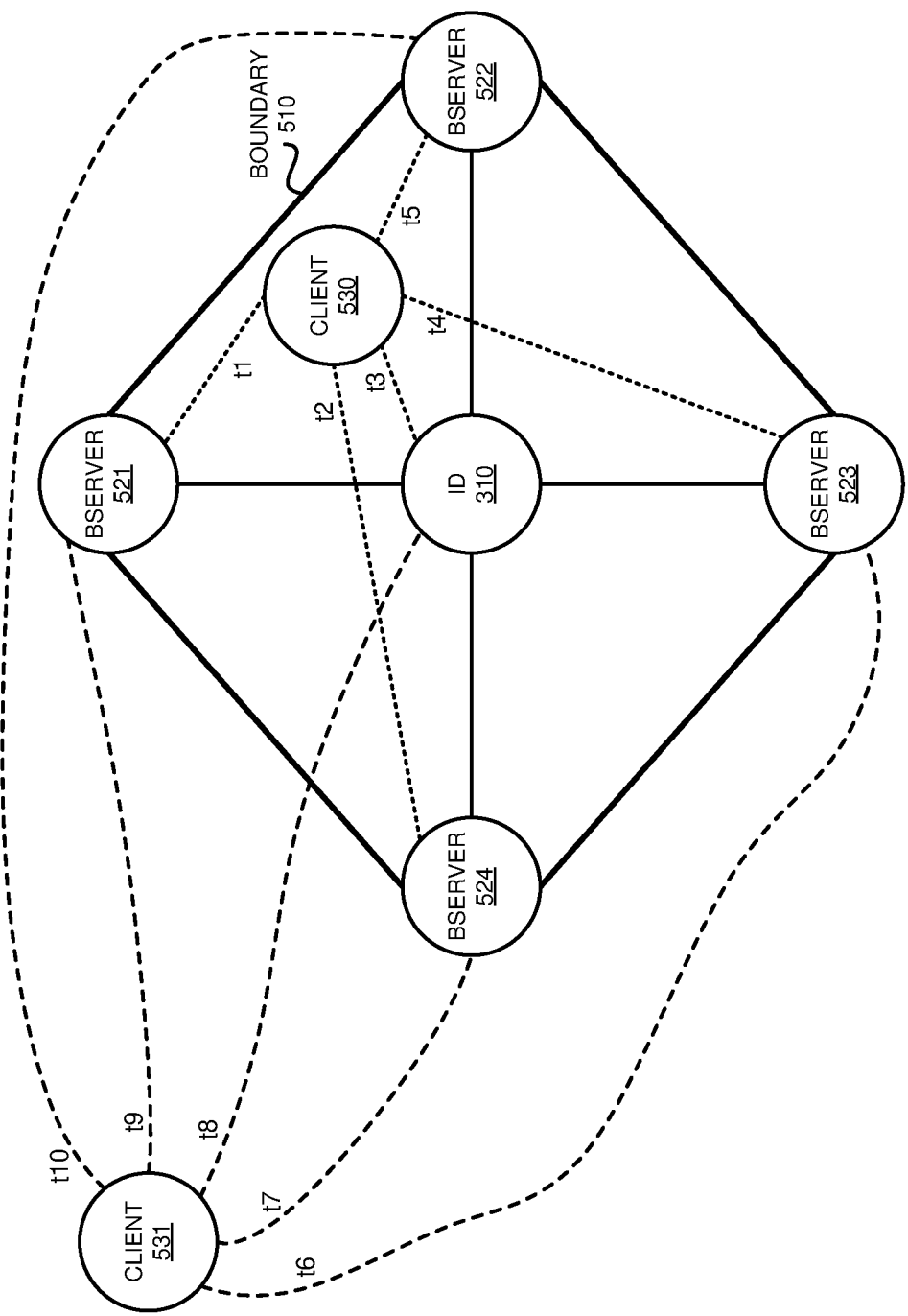
FIG. 5 depicts an example of client-server response time based computer system geolocation in accordance with an illustrative embodiment.

With reference to FIG. 5, this figure depicts an example of client-server response time based computer system geolocation in accordance with an illustrative embodiment. Identification (ID) server 310 is the same as ID server 310 in FIG. 3. Bservers 521, 522, 523, and 524 are each an instance of boundary server 320 in FIG. 3. Clients 530 and 531 are each an instance of client 330 in FIG. 3.

ID server 310 knows the physical locations of Bservers 521, 522, 523, and 524, which form boundary 510. Client 530 reports certificates including t1 (an elapsed time between client 530 and Bserver 521), t2 (an elapsed time between client 530 and Bserver 524), t3 (an elapsed time between client 530 and ID server 310 acting as a boundary server instance), t4 (an elapsed time between client 530 and Bserver 523), and t5 (an elapsed time between client 530 and Bserver 522) to ID server 310. ID server 310 uses t1, t2, t3, t4, and t5 to determine that client 530 is within boundary 510.

Client 531 reports certificates including t9 (an elapsed time between client 531 and Bserver 521), t7 (an elapsed time between client 531 and Bserver 524), t8 (an elapsed time between client 531 and ID server 310 acting as a boundary server instance), t6 (an elapsed time between client 531 and Bserver 523), and t10 (an elapsed time between client 531 and Bserver 522) to ID server 310. ID server 310 uses t6, t7, t8, 9, and t10 to determine that client 5301 is not within boundary 510.

Figure 6:
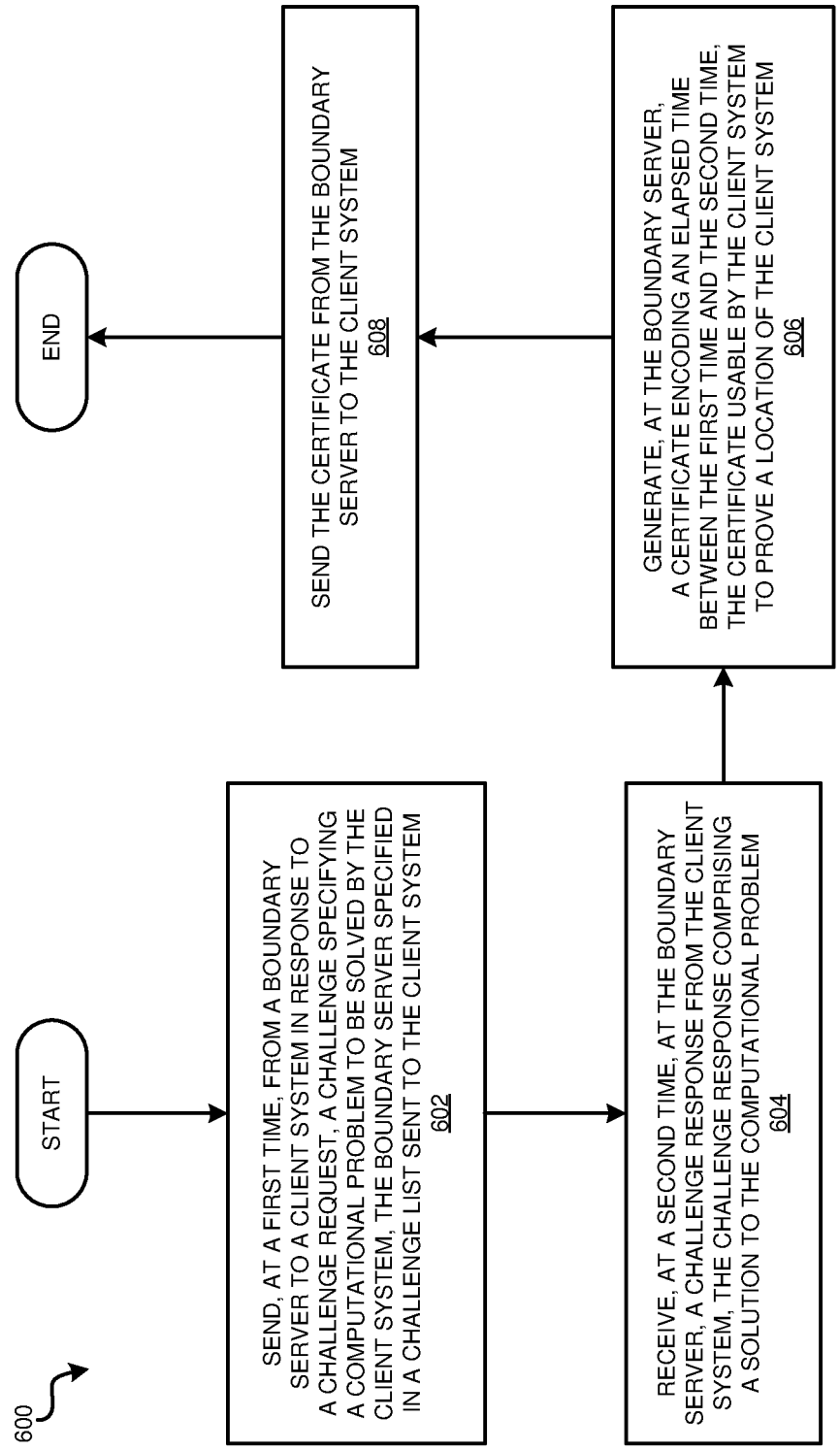
FIG. 6 depicts a flowchart of an example process for client-server response time based computer system geolocation in accordance with an illustrative embodiment.

With reference to FIG. 6, this figure depicts a flowchart of an example process for client-server response time based computer system geolocation in accordance with an illustrative embodiment. Process 600 can be implemented in boundary server 320 in FIG. 3.

In the illustrated embodiment, at block 602, the process sends, at a first time, from a boundary server to a client system in response to a challenge request, a challenge specifying a computational problem to be solved by the client system, the boundary server specified in a challenge list sent to the client system. At block 604, the process receives, at a second time, at the boundary server, a challenge response from the client system, the challenge response comprising a solution to the computational problem. At block 606, the process generates, at the boundary server, a certificate encoding an elapsed time between the first time and the second time, the certificate usable by the client system to prove a location of the client system. At block 608, the process sends the certificate from the boundary server to the client system. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    sending, at a first time, from a boundary server to a client system, in response to a challenge request, a challenge specifying a computational problem to be solved by the client system, the boundary server specified in a challenge list sent to the client system and selected based on an internet protocol (IP) address of the client system;
    receiving, at a second time, at the boundary server, a challenge response from the client system, the challenge response comprising a solution to the computational problem;
    generating, at the boundary server, a certificate encoding an elapsed time between the first time and the second time, the certificate usable by the client system to prove a location of the client system; and
    sending, from the boundary server to the client system, the certificate.

2. The computer-implemented method of claim 1, wherein the challenge list comprises a plurality of boundary servers including the boundary server, each of the plurality of boundary servers having a known physical location.

3. The computer-implemented method of claim 2, wherein each of the plurality of boundary servers was selected for inclusion in the challenge list using the known physical location of each of the plurality of boundary servers.

4. The computer-implemented method of claim 1, wherein the elapsed time encoded in the certificate, a second elapsed time encoded in a second certificate generated by a second boundary server, and a third elapsed time encoded in a third certificate generated by a third boundary server are usable in performing trilateration of the location of the client system.

5. The computer-implemented method of claim 1, further comprising:
cryptographically signing, at the boundary server, prior to the sending, the certificate, the signing performed using a key unknown to the client system.

6. The computer-implemented method of claim 1, further comprising:
sending, at a third time, from the boundary server to the client system in response to a second challenge request, a second challenge specifying a string to be echoed by the client system;
receiving, at a fourth time, at the boundary server, a second challenge response from the client system, the second challenge response comprising the string; and
generating, at the boundary server, a fourth certificate encoding the lesser of the elapsed time and a second elapsed time, the second elapsed time comprising a difference between the fourth time and the third time, the fourth certificate usable by the client system to prove the location of the client system.

7. A computer program product comprising one or more computer readable storage media, and program instructions collectively stored on the one or more computer readable storage media, wherein the stored program instructions are stored in a computer readable storage device in a data processing system, wherein the stored program instructions are transferred over a network from a remote data processing system, and wherein stored program instructions are downloaded in response to a request over the network to the remote data processing system for use in the computer readable storage device associated with the remote data processing system, the stored program instructions executable by a processor to cause the processor to perform operations comprising:
sending, at a first time, from a boundary server to a client system in response to a challenge request, a challenge specifying a computational problem to be solved by the client system, the boundary server specified in a challenge list sent to the client system;
receiving, at a second time, at the boundary server, a challenge response from the client system, the challenge response comprising a solution to the computational problem;
generating, at the boundary server, a certificate encoding an elapsed time between the first time and the second time, the certificate usable by the client system to prove a location of the client system; and
sending, from the boundary server to the client system, the certificate;
wherein the stored program instructions further comprise:
program instructions to meter use of the program instructions associated with the request; and
program instructions to generate an invoice based on the metered use.

8. The computer program product of claim 7, wherein the challenge list comprises a plurality of boundary servers including the boundary server, each of the plurality of boundary servers having a known physical location.

9. The computer program product of claim 8, wherein each of the plurality of boundary servers was selected for inclusion in the challenge list using the known physical location of each of the plurality of boundary servers.

10. The computer program product of claim 7, wherein the elapsed time encoded in the certificate, a second elapsed time encoded in a second certificate generated by a second boundary server, and a third elapsed time encoded in a third certificate generated by a third boundary server are usable in performing trilateration of the location of the client system.

11. The computer program product of claim 7, further comprising:
cryptographically signing, at the boundary server, prior to the sending, the certificate, the signing performed using a key unknown to the client system.

12. The computer program product of claim 7, further comprising:
sending, at a third time, from the boundary server to the client system in response to a second challenge request, a second challenge specifying a string to be echoed by the client system;
receiving, at a fourth time, at the boundary server, a second challenge response from the client system, the second challenge response comprising the string; and
generating, at the boundary server, a fourth certificate encoding the lesser of the elapsed time and a second elapsed time, the second elapsed time comprising a difference between the fourth time and the third time, the fourth certificate usable by the client system to prove the location of the client system.

13. A computer system comprising a processor and one or more computer readable storage media, and program instructions collectively stored on the one or more computer readable storage media, the program instructions executable by the processor to cause the processor to perform operations comprising:
sending, at a first time, from a boundary server to a client system in response to a challenge request, a challenge specifying a computational problem to be solved by the client system, the boundary server specified in a challenge list sent to the client system and selected based on an internet protocol (IP) address of the client system;
receiving, at a second time, at the boundary server, a challenge response from the client system, the challenge response comprising a solution to the computational problem;
generating, at the boundary server, a certificate encoding an elapsed time between the first time and the second time, the certificate usable by the client system to prove a location of the client system; and
sending, from the boundary server to the client system, the certificate.

14. The computer system of claim 13, wherein the challenge list comprises a plurality of boundary servers including the boundary server, each of the plurality of boundary servers having a known physical location.

15. The computer system of claim 14, wherein each of the plurality of boundary servers was selected for inclusion in the challenge list using the known physical location of each of the plurality of boundary servers.

16. The computer system of claim 13, wherein the elapsed time encoded in the certificate, a second elapsed time encoded in a second certificate generated by a second boundary server, and a third elapsed time encoded in a third certificate generated by a third boundary server are usable in performing trilateration of the location of the client system.

17. The computer system of claim 13, further comprising:
cryptographically signing, at the boundary server, prior to the sending, the certificate, the signing performed using a key unknown to the client system.

18. The computer system of claim 13, further comprising:
sending, at a third time, from the boundary server to the client system in response to a second challenge request, a second challenge specifying a string to be echoed by the client system;

receiving, at a fourth time, at the boundary server, a second challenge response from the client system, the second challenge response comprising the string; and generating, at the boundary server, a fourth certificate encoding the lesser of the elapsed time and a second elapsed time, the second elapsed time comprising a difference between the fourth time and the third time, the fourth certificate usable by the client system to prove the location of the client system.

* * * * *